United States Patent
Yoshida

(10) Patent No.: US 7,298,408 B2
(45) Date of Patent: Nov. 20, 2007

(54) METHOD AND APPARATUS FOR IMAGE CAPTURING CAPABLE OF CAPTURING AN IMAGE WITH A REDUCED CURRENT CONSUMPTION

(75) Inventor: Kazuhiro Yoshida, Kanagawa-ken (JP)

(73) Assignee: Ricoh Company Limited, Tokyo (JP)

( * ) Notice: Subject to any disclaimer, the term of this patent is extended or adjusted under 35 U.S.C. 154(b) by 873 days.

(21) Appl. No.: 10/636,711

(22) Filed: Aug. 8, 2003

(65) Prior Publication Data
US 2004/0061802 A1    Apr. 1, 2004

(30) Foreign Application Priority Data
Aug. 9, 2002  (JP)  .............. 2002-232495

(51) Int. Cl.
H04N 5/335    (2006.01)
H04N 5/238    (2006.01)
H04N 5/225    (2006.01)

(52) U.S. Cl. ............... 348/314; 348/312; 348/367; 348/372

(58) Field of Classification Search .......... 348/372, 348/312, 367, 363, 314
See application file for complete search history.

(56) References Cited

U.S. PATENT DOCUMENTS 6,700,610 B1 *   3/2004  Kijima et al. ............... 348/296
6,812,965 B1 *  11/2004  Kijima et al. ............... 348/312
6,982,750 B1 *   1/2006  Yoshida et al. ............ 348/219.1
7,064,787 B2 *   6/2006  Kijima et al. ............... 348/296
7,164,445 B2 *   1/2007  Kijima et al. ............... 348/314
2002/0093580 A1 *  7/2002  Kijima et al. ............... 348/296
2002/0126214 A1 *  9/2002  Kijima et al. ............... 348/296

* cited by examiner

*Primary Examiner*—Lin Ye
*Assistant Examiner*—Nicholas G Giles
(74) *Attorney, Agent, or Firm*—Oblon, Spivak, McClelland, Maier & Neustadt, P.C.

(57) ABSTRACT

An imaging apparatus includes an image optical pick-up device, first and second driving mechanisms, a shutter, and a driving current controlling mechanism. The image optical pick-up device photoelectrically converts an incident light image of a subject of a photograph. The first driving mechanism drives the image optical pick-up device and performs a rapid sweep function for rapidly draining unnecessary electric charges remaining in the image optical pick-up device. The shutter opens and closes a light passage for passing the incident light image into the image optical pick-up device. The second driving mechanism generates pulses to drive the shutter. The driving current controlling mechanism performs a control such that a first duration in which the first driving mechanism operates the rapid sweep function and as second duration in which the second driving mechanism generates a pulse for closing the shutter do not overlap under predetermined imaging environmental conditions.

15 Claims, 8 Drawing Sheets

METHOD AND APPARATUS FOR IMAGE CAPTURING CAPABLE OF CAPTURING AN IMAGE WITH A REDUCED CURRENT CONSUMPTION

BACKGROUND OF THE INVENTION

1. Field of the Invention

The present invention relates to an imaging capture method and apparatus, and more particularly to a method and apparatus for image capturing that is capable of capturing an image with a reduced current consumption.

2. Discussion of the Background

In recent years, imaging capture apparatuses such as digital cameras, for example, have been developed and become popular. The digital camera converts an optical image to electric image data and digitally records the image data on a storage medium. When the image is reproduced, the recorded digital data is retrieved from the storage medium and displayed on a display device or printed out as a hard copy image.

Referring initially to FIG. 1, a background digital camera 25 generally includes an optical lens 1, a mechanical shutter 2, an image optical pick-up element 3, a sample/hold circuit 5, an A/D (analog-to-digital) converter 6, a shutter drive circuit 7, a timing generating device 8, an image data controller 10, a system controller 11, a DRAM (dynamic random access memory) 12, an image display device 13, an image compression circuit 14, an image recording media 15, an EEPROM 16, and a manipulation switch 17.

The optical lens 1 focuses light rays onto a light receiving surface. The optical lens 1 is shown on the left side of FIG. 1. The mechanical shutter 2 controls incident rays of a light image. The optical pick-up element 3 includes photo-optic cells capable of converting the light rays received from the optical lens 1 into representative analog signals. Most commonly, the photo-optic cells take the form of Charge-Coupled Devices (CCDs).

The sample/hold circuit 5 extracts data corresponding to pixels of the image signals that are input from the image optical pick-up elements 3. The A/D converter 6 converts the representative analog signals into the digital signals representative of the image. The shutter drive circuit 7 provides shutter drive signals to the mechanical shutter 2.

The time generating device 8 supplies a synchronous signal to each of the optical pick-up elements 3, the sample/hold circuit 5, the A/L) converter 6, and the image data controller 10.

The image data controller 10 performs various operations such as an image processing including pixel interpolation, gamma compensation, gradation compensation image display signal conversion, and storage signal conversion. The system controller 11 controls the entire system associated with an operation of the digital camera. The DRAM 12 allows various image data to be temporary written and read when necessary. The image display device 13 displays a monitoring image during an operation associated with image processing and also displays captured images.

The image compression circuit 14 receives the appropriately formatted digital signals. The image compression circuit 14 operates to digitally compress the received digital images to reduce the amount of resources required to further process the digital signals. One such formatting scheme referred to as JPEG is commonly used, although there are a wide variety of suitable picture formats. The image recording media 15 includes a memory card for storing the image data of a captured image. The manipulation switch 17 provides manual input according to an order from an operator.

Referring now to FIG. 2, the image optical pick-up elements 3 of FIG. 1 take the form of interlines. Photodiodes 23 are arranged in a matrix with eight rows and four columns. Color filters R, G, and B are attached to the respective photodiodes 23 that respectively form pixel components, in accordance with a Bayer arrangement. Each of four vertical registers 20 is arranged to receive electric charges from the corresponding photodiodes aligned in a horizontal line and to transfer the received charges downwards. A horizontal register 21 is arranged to transfer the charges received from the four vertical registers 20. An output amplifier 22 that amplifies output signals is connected to an output side of the horizontal register 21.

Referring now to FIG. 3, an exemplary relationship is shown of various signals produced in the background digital camera 25. As shown in FIG. 3, a vertical synchronous signal VD sets a unit time to obtain one page of image data. Based on the photometric data of an object, an output duration in which a sub-pulse SUB is output is set and is controlled by the system controller 11. The mechanical shutter 2 is made to be opened by the shutter drive circuit 7, which operates upon an instruction of the system controller 11. An electric shutter operation for the image optical pick-up element 3 is performed during the time in which the sub-pulse SUB suspends outputting by a control signal supplied by the timing generating device 8. An exposure time of the image optical pick-up elements 3 that perform a shutter operation to the photodiode 23 is controlled by a discrete value of the sub-pulse SUB. During the exposure time, the electric charges are stored in the photodiodes 23. The electric charges stored in the above-described process are sequentially read by the vertical register 20 by placing a predetermined plus voltage to a vertical transfer electrode (not shown). The electric charges are transferred in the vertical direction by electric charges aligned in a unit of one horizontal line to the horizontal register 21. The electric charges are transferred along the horizontal register 21 and are output from the amplifier 32 (i.e., a CCD OUT in FIG. 3)

In FIG. 3, a recording trigger Tr for an image recording is produced upon a depressing of a release switch (not shown) in the monitoring mode. When the recording trigger Tr is produced, a shutter pulse is output by the shutter driving circuit 7 after the time the sub-pulse SUB is output under a control of the system controller 11 during a unit time corresponding to the vertical synchronous signal VD immediately following the recording trigger Tr. The shutter pulse is output before a time the mechanical shutter 2 is closed by a response time tm. After the lapse of the time point tm, the mechanical shutter 2 is closed and the exposure ends.

When the image optical pick-up elements 3 are interline-type CCDs, the electric charges are read from the photodiode 23 to the vertical register 20 in two or more fields. However, before the electric charges are transferred to the vertical register 20, unnecessary charges such as dark currents or smear components, in the vertical register 20, for example, are swept rapidly.

In this case, as shown in FIG. 3, image data are read twice, that is, from an odd number field and an even number field. There is a time Tp in which the above-described unnecessary charges are swept rapidly before transferring the electric charges to the vertical register 20. In a unit of time after the electric charges of the even number field are transferred, the shutter pulse begins to be output, the mechanical shutter 2 is opened, and monitoring begins.

As described above, imaging signals output from the image optical pick-up elements 3 are subject to a noise control by a correlation duplex sampling in the sample/hold circuit 5 and R, G, and B signals output from each of pixels are sampled and held, then undergo an A/D conversion by an integral multiple of the sub-carrier frequency of the NTSC signal, for example, by the A/D conversion circuit 6, and are then input to the image data controller 10. The R, G, and B signals to be input to the image data controller 10 are stored in the DRAM 12. Then, signal processing such as a white-balance calibration and a gamma processing, for example, are performed for the R, G, and B signals read from the DRAM 12 and luminance signals Y and color-difference signals Cr and Cb are created and stored in the DRAM 12.

To display an image of the object by the image display device 13, the image of the object is displayed in the image display device 13 based on the luminance signal Y and the color-difference signal that are read under control of the image data controller 10.

When the image of the object is stored in the image recording media 15 such as a memory card, for example, under the control of the image data controller 10, the luminance signals Y and the color-difference signals Cr and Cb are compressed in a predetermined format by the image compression circuit 14 and the compressed data are stored in the image media 15.

Furthermore, when image data stored in the image media 15 are reproduced, under the control of the image data controller 10, the image data read from the image media 15 are decompressed by the image compression circuit 14 and are displayed as an image of the object in the image display device 13.

The structure and function of the background digital camera is explained so far. However, unfortunately, the above-described background digital camera has a limitation in which because electric charges are sequentially transferred in the vertical register more rapidly than a normal electric charge reading in the rapid sweep of unnecessary electric charges such as dark current components or smear components, that thereby increases the current consumption. When the mechanical shutter is in operation, a shutter pulse needs to be kept being output for a predetermined period to maintain a shutter operation, resulting in more current consumption.

SUMMARY OF THE INVENTION

In view of the foregoing, it is an object of the present invention to provide a novel imaging apparatus that is capable of reducing a current consumption during an imaging process and being downsized into a compact and lightweight imaging apparatus.

Another object of the present invention is to provide a novel imaging method for an imaging apparatus that is capable of reducing a current consumption during an imaging process and being downsized into a compact and lightweight imaging apparatus.

To achieve the above-mentioned and other objects, in one example, an imaging apparatus includes an image optical pick-up device, a first driving mechanism, a shutter, a second driving mechanism, and a driving current controlling mechanism. The image optical pick-up device includes vertical charge transfer paths and is configured to photo-electrically convert an incident light image of a subject of a photograph and to output a conversion result as image signals. The first driving mechanism is configured to drive the image optical pick-up device and has a rapid sweep function for rapidly draining unnecessary electric charges remaining in the image optical pick-up device through the vertical charge transfer paths. The shutter is configured to open and close a light passage for passing the incident light image of the subject of the photograph into the image optical pick-up device. The second driving mechanism is configured to generate pulses to drive the shutter. The driving current controlling mechanism is configured to control the image optical pick-up device and the shutter such that a first duration in which the first driving mechanism operates the rapid sweep function and a second duration in which the second driving mechanism generates a pulse for closing the shutter do not overlap under predetermined imaging environmental conditions.

The above-mentioned novel imaging apparatus may further include a determining mechanism configured to determine whether the imaging apparatus is under the predetermined imaging environmental conditions.

The determining mechanism may check an environmental temperature relative to the imaging apparatus and determine that the imaging apparatus is under the predetermined environmental conditions when the imaging environmental temperature is below a predetermined standard temperature.

The determining mechanism may check a power supply voltage of the imaging apparatus and determine that the imaging apparatus is under the predetermined environmental conditions when the power supply voltage is below a predetermined standard voltage.

The determining mechanism may check a current consumption of the imaging apparatus and determine that the imaging apparatus is under the predetermined environmental conditions when the current consumption is below a predetermined standard current consumption.

To achieve the above-mentioned and other objects, in one example, a novel imaging method for an imaging apparatus includes operations of performing, driving, converting, and outputting. The performing performs a rapid sweep function for rapidly draining unnecessary electric charges remaining in an image optical pick-up device through vertical charge transfer paths of the image optical pick-up device. The driving drives a shutter to capture an incident light image of a subject of a photograph through the image optical pick-up device. The converting converts the incident light image of the subject of the photograph in a photoelectrical manner. The outputting outputs a conversion result as image signals. In this method, the performing and driving are controlled such that a first duration in which the rapid sweep function is operated and a second duration in which a pulse for closing the shutter is generated do not overlap under predetermined imaging environmental conditions.

The above-mentioned novel imaging method may further include determining whether the imaging apparatus is under the predetermined imaging environmental conditions.

The determining may check an environmental temperature relative to the imaging apparatus and determine that the imaging apparatus is under the predetermined environmental conditions when the imaging environmental temperature is below a predetermined standard temperature.

The determining may check a power supply voltage of the imaging apparatus and determine that the imaging apparatus is under the predetermined environmental conditions when the power supply voltage is below a predetermined standard voltage.

The determining may check a current consumption of the imaging apparatus and determines that the imaging apparatus is under the predetermined environmental conditions when the current consumption is below a predetermined standard current consumption.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
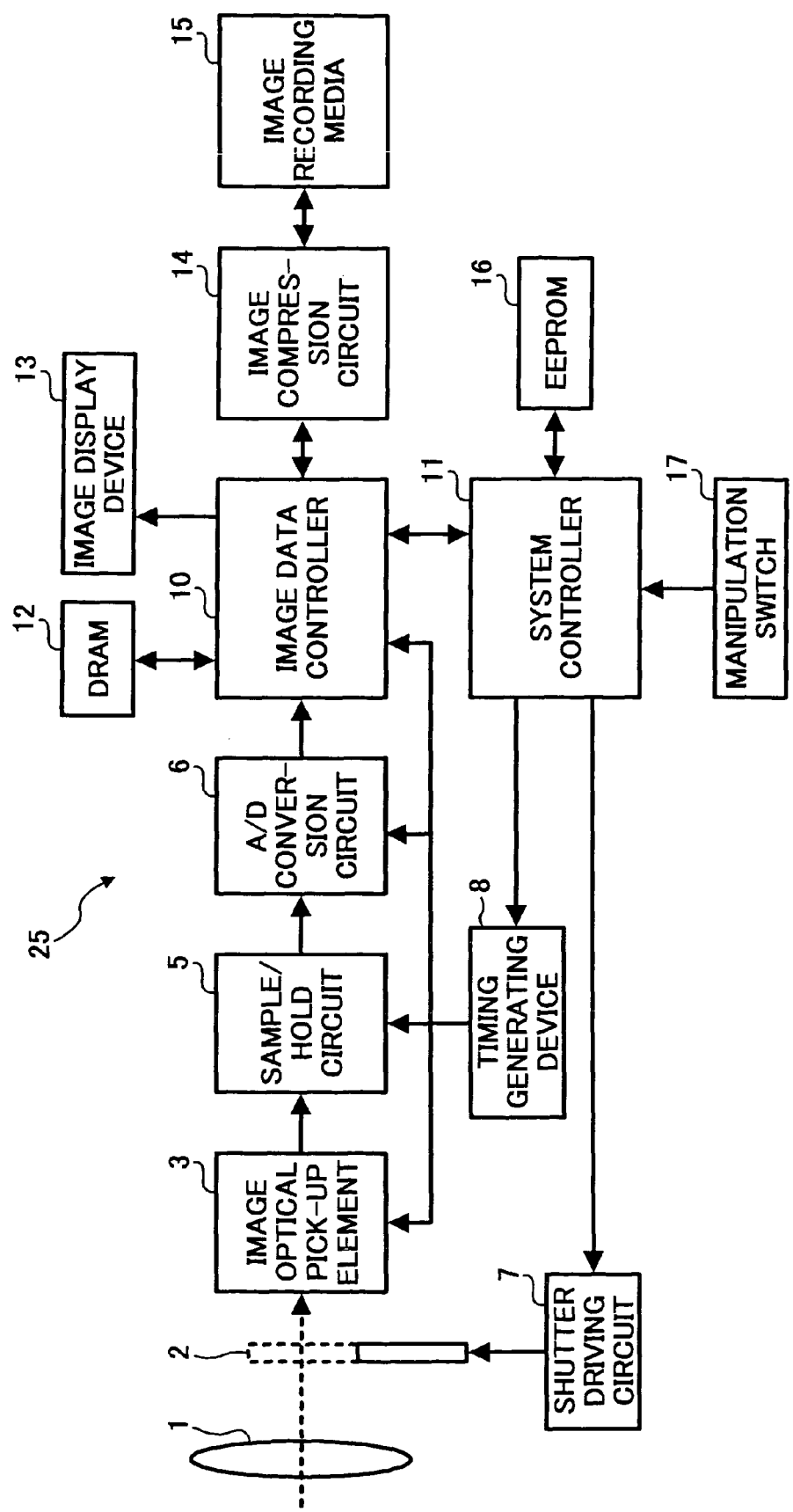
FIG. 1 is a block diagram showing an exemplary structure of a background digital camera.
Figure 2:
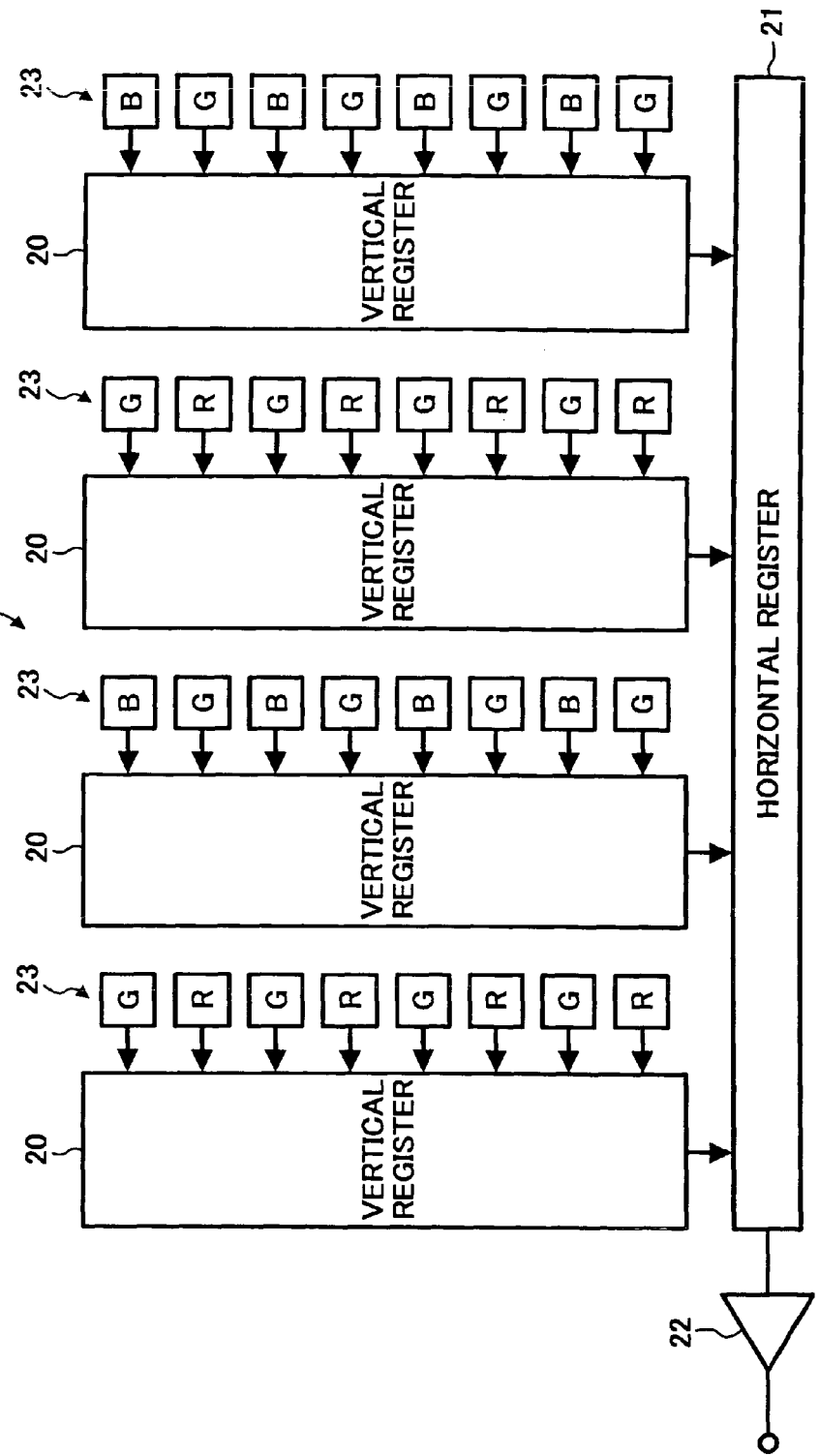
FIG. 2 is an illustration showing an exemplary structure of image optical pick-up elements of the background digital camera shown in FIG. 1.
Figure 3:
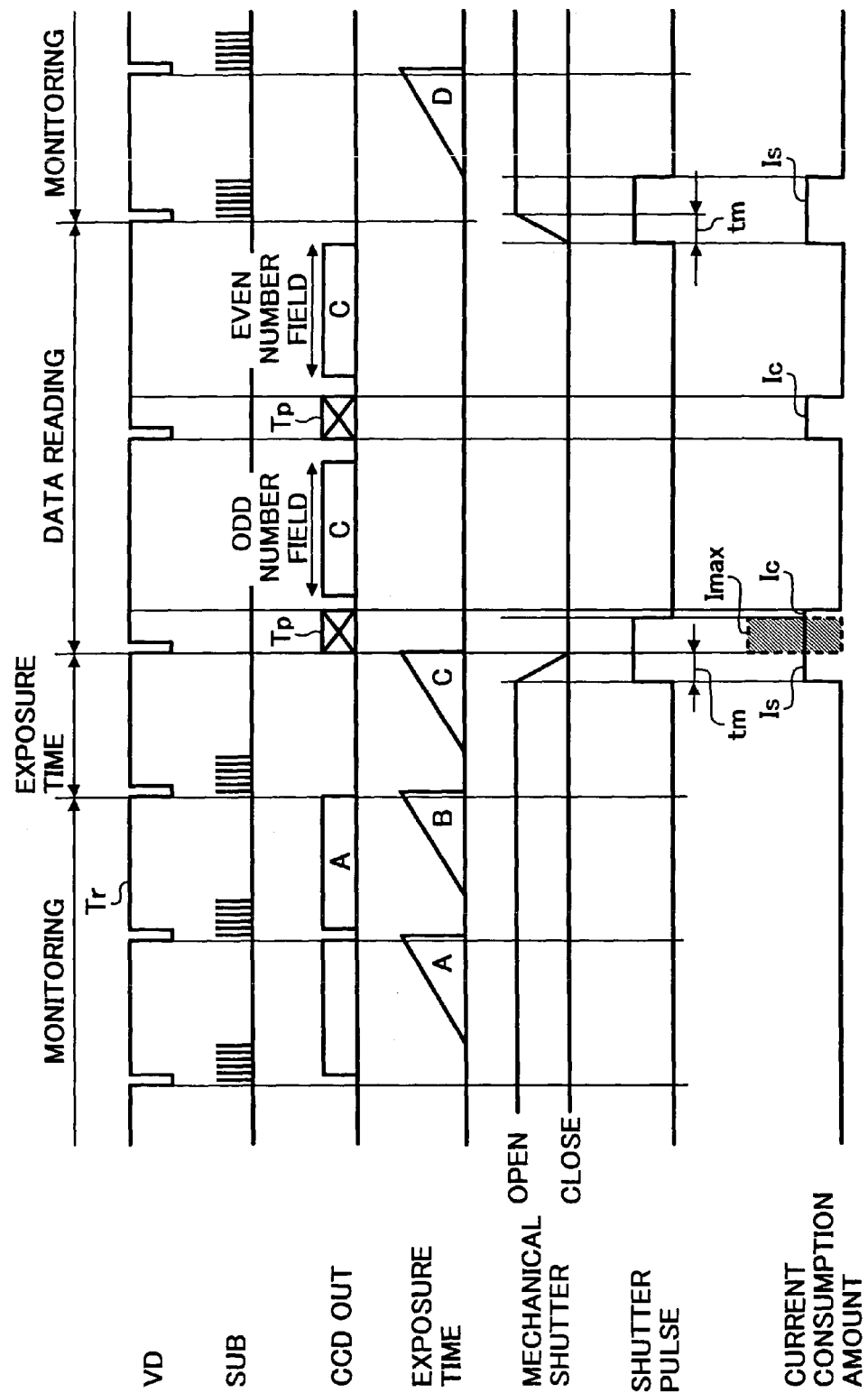
FIG. 3 is a time chart for explaining imaging operation performed by the background digital camera of FIG. 1.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 4:
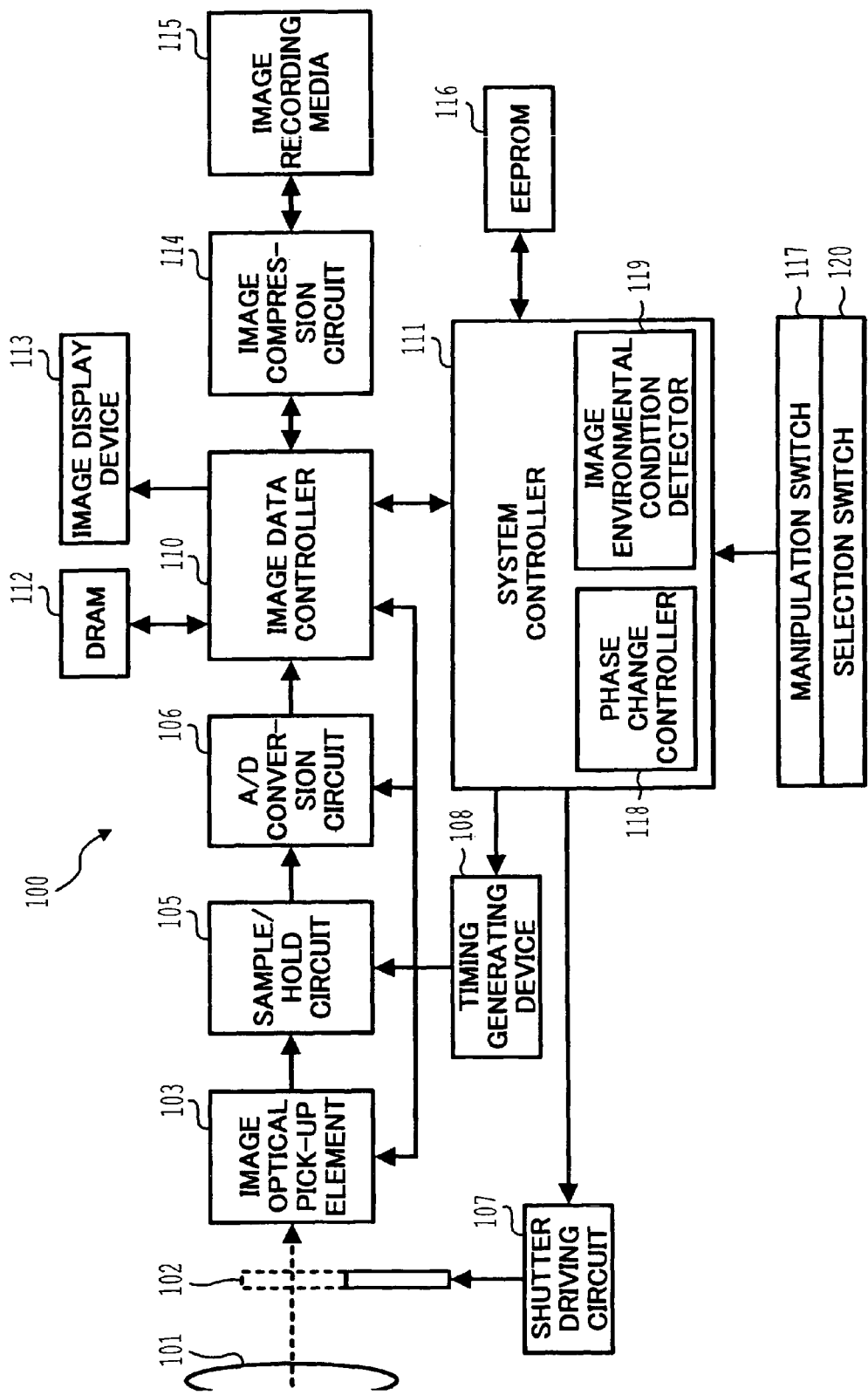
FIG. 4 is a block diagram of a digital camera according to a preferred embodiment of the present invention.

Referring now to the drawings, wherein like reference numerals designate identical or corresponding parts throughout the several views, and particularly to FIG. 4, a description is made for a digital camera 100 according to a preferred embodiment of the present invention.

In FIG. 4, the digital camera 100 includes an optical lens 101, a mechanical shutter 102, an image optical pick-up element 103, a sample/hold circuit 105, an A/D conversion circuit 106, a shutter drive circuit 107, a timing generating device 108, an image data controller 110, a system controller 111, a DRAM 112, an image display device 113, an image compression circuit 114, an image recording media 115, an EEPROM 116, a manipulation switch 117, and a selection switch 120.

The system controller 111 includes a phase change controller 118 and an image environmental condition detector 119. The selection switch 120 includes a switch for selecting modes from among a temperature detection mode, a power voltage detection mode, and a current consumption detection mode.

As shown in FIG. 4, the image optical pick-up elements 103 include, for example, a Charge Coupled Device (CCD) to convert a still image of an object into an electric signal when a picture shoot instruction is initiated. The image is formed on a light receiving surface and is output. The lens 101 is shown on the left side of the digital camera 100 and is capable of directing light from any object to the light receiving surface (not shown) and to form an electric optical image of the object onto the light receiving surface (not shown) of the image optical pick-up elements 103. The optics may include such optical systems as fiber optic transducers and fiber optic cables, refractive mirror assemblies, or any system or device capable of being optically coupled to the light receiving surface (not shown).

The mechanical shutter 102 is shown between the lens 101 and the image optical pick-up elements 103 to control incident rays of the light image of the object into the image optical pick-up elements 103. An output terminal (not shown) of the image optical pick-up pixels of the image signals that are input from the image optical pick-up elements 103. The sample/hold circuit 105 is also connected to the A/D conversion circuit 106, which performs an A/D conversion by an integral multiple of sub-carrier frequency of an NTSC signal, for example.

The light receiving surface (not shown) typically includes a grid, or array, of photo-elements. The photo-elements are any device capable of converting incident light in the form of photons into electrical signals. These photo-elements are generally formed of a semiconductor material, including the CCD. Generally, each of the photo-elements is associated with what is referred to as a pixel (short for picture element). A terminal of the A/D conversion circuit 106 is connected to the image data controller 110. The image data controller 110 performs various kinds of operations for the digital image signals transferred from the A/D conversion circuit 106 such as image processing including pixel interpolation, gamma compensation, gradation compensation, image display signal conversion, and image storage signal conversion. The image data controller 110 is connected to the DRAM 112 and the image display device 113. The DRAM 112 allows various data to be temporary written and read when necessary. The image display device 113 displays a monitoring image or an image during an image forming operation. The image data controller 110 is also connected to the image compression circuit 114. In the image compression circuit 114, e.g. based on the Joint Photographic Experts Group (JPEG), a part of the International Telegraph and Telephone Committee (CCITT), an image compression algorithm is performed to compress the size of the image. The image compression circuit 114 is connected to memory cards such as the image recording media 115, for example. The image recording media 115 stores image data.

The system controller 111 includes a phase change controller 118 and an image environmental condition detector 119. The system controller 111 is connected to the EEPROM (Electrically Erasable Programmable) 116, which stores a control program, and the above-described image data controller 110. The phase change controller 118 shifts the duration in which a shutter pulse is output to the front by a unit of time designated by the vertical scanning signal VD. The environmental condition detector 119 determines whether the system controller 111 instructs to operate the phase change controller 118 in accordance with image environmental conditions.

The system controller 111 is also connected to the manipulation switch 117. The manipulation switch 117 inputs various instruction signals given by operators. In the selection switch 120, the temperature detection mode switch performs detection utilizing an environmental temperature as an image environmental condition. The power voltage detection mode switch performs detection utilizing the power voltage as an image environmental condition and a current consumption detection mode performs detection utilizing the current consumption as an image environmental condition.

Likewise, the system controller 111 is connected to the timing generating device 108 and the shutter drive circuit 107. The timing generating device 108 supplies timing signals respectively to the image optical pick-up elements 103, the sample/hold circuit 105, the A/D conversion circuit 106, and the image data controller 110. The shutter drive circuit 107 supplies driving signals to the mechanical shutter 102.

Figure 5:
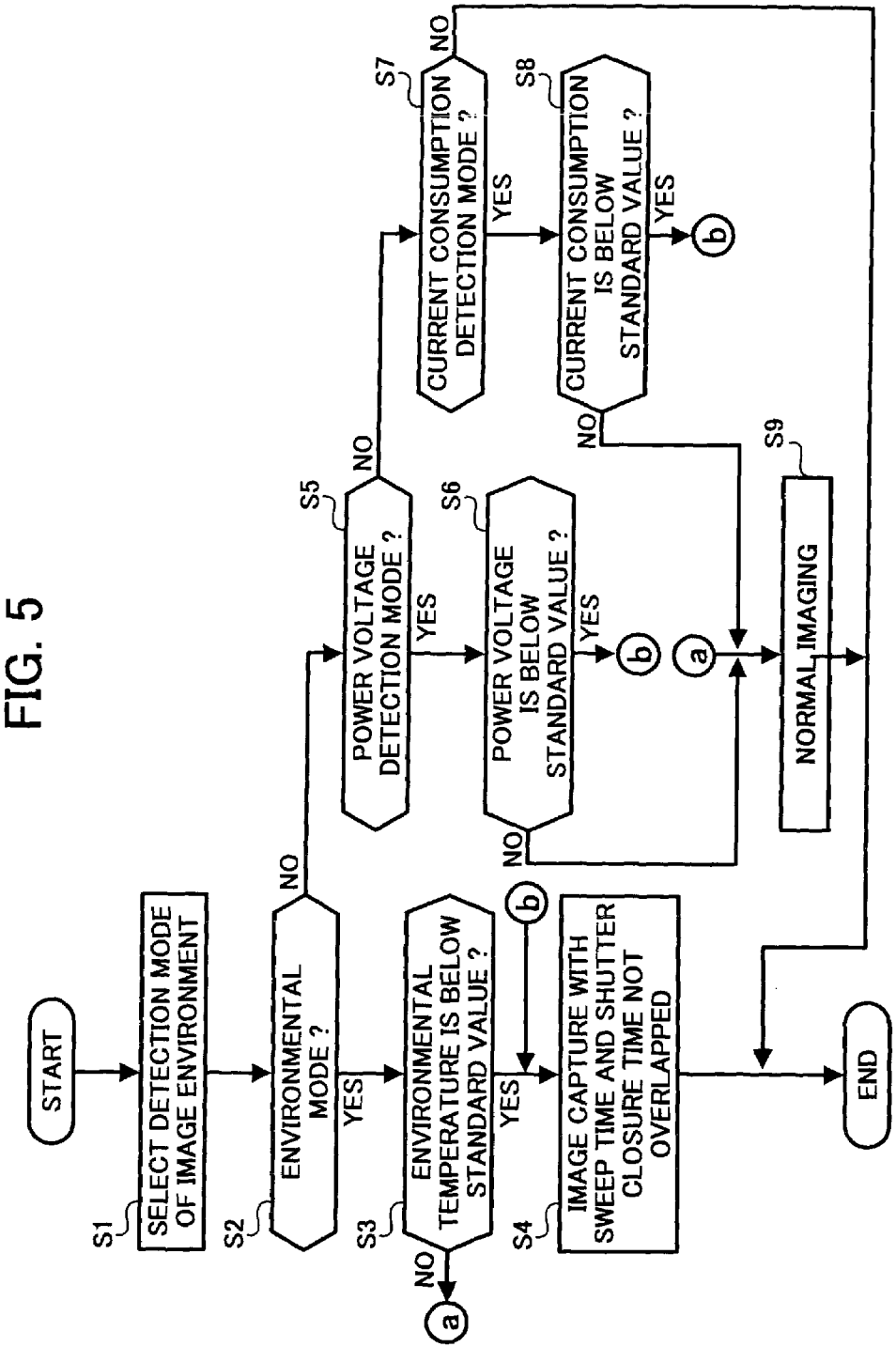
FIG. 5 is a flowchart showing an exemplary procedure of a mode selection operation for selecting a desired image atmosphere determination mode performed by the digital camera of FIG. 4.
Figure 6:
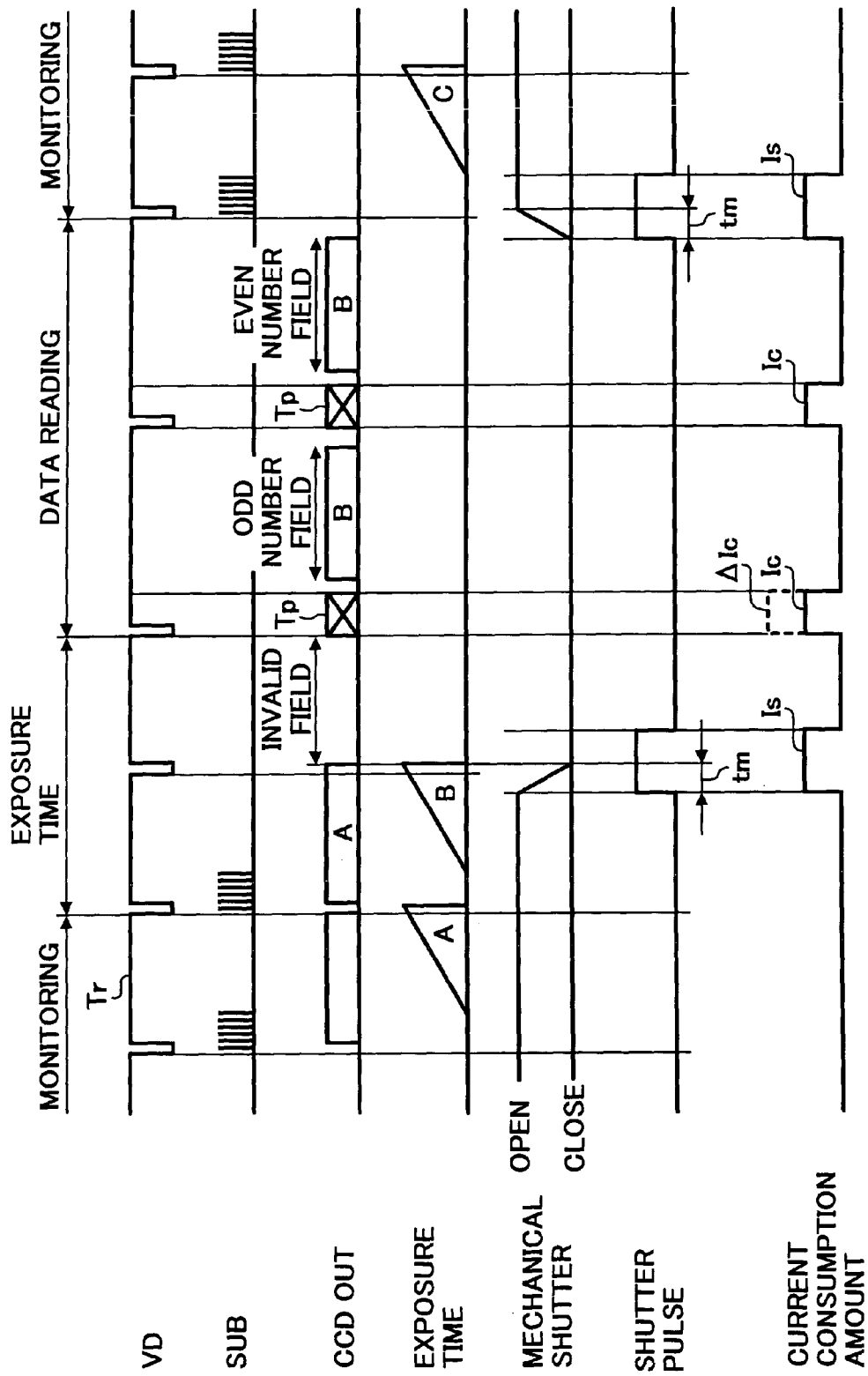
FIG. 6 is a time chart showing an exemplary relationship among signals produced in an image operation performed by the digital camera of FIG. 4.

An exemplary procedure of an imaging operation performed by the digital camera 100 will be explained with reference to FIGS. 5 and 6. FIG. 5 is a flowchart of the procedure of the imaging operation performed by the digital camera 100 and FIG. 6 is a timing chart showing an exemplary relationship among various signals produced by the digital camera 100 during its imaging operation.

Users can manipulate the digital camera 100 with the manipulation switch 117. In Step S1 of FIG. 5, a user selects one of a temperature detection mode, a power voltage detection mode, a voltage detection mode, and a current consumption detection mode with the manipulation switch 117. In Step S2, the user determines whether the imaging apparatus 100 is in the temperature detection mode with the manipulation of the manipulation switch 117 under control of the system controller 111. When the system controller 111 determines that the temperature detection mode is selected (YES in step S2), the system controller 111 determines in Step S3 whether a temperature Ta of an imaging environment is below a predetermined standard temperature Tso.

Generally, batteries used in digital camera are subject to an environmental temperature change, and more specifically, internal resistance value of alkaline batteries becomes high in a low temperature. There is less power supply to an imaging apparatus and when a current consumption increases rapidly in a low temperature, it is possible that the imaging apparatus does not work.

In the preferred embodiment of the present invention, data including information associated with the standard temperature Tso that serves as a standard of detection in the temperature detection mode are prestored in the EEPROM 116. In Step S3 of FIG. 5, the system controller 111 determines whether the imaging environment temperature Ta detected when the recording trigger Tr is output at a predetermined interval of time operated by a sensor equipped in the digital camera 100 or a push of the release switch is equal to or smaller than the standard temperature Tso. When the system controller 111 determines that Ta is greater than Tso whose condition does not satisfy the above-described recommended condition that the imaging environmental temperature Ta is equal to or smaller than the standard temperature Tso (No in Step S3), the system controller 111 proceeds the process to Step S9 in which an imaging operation is performed in a sequence that the duration of a rapid sweep of unnecessary electric charges and the duration of outputting the pulse indicating closure of the mechanical shutter are overlapped.

Meanwhile, when the system controller 111 determines that the imaging environmental temperature Ta satisfies the condition that Ta is equal to or smaller than Tso in Step S3 (Yes in Step S3), the system controller 111 instructs the process to go to Step S4. In Step S4, a phase change is performed in which the duration of outputting a shutter pulse is shifted to the front by a unit of time designated by the vertical scanning signals VD, as shown in FIG. 6. In the above-described case, the duration of the rapid sweep of unnecessary electric charges and the duration of outputting the pulse indicating closure of the mechanical shutter do not overlap so that a shutter pulse current consumption Is is not superimposed on a sweep current consumption Ic consumed in the duration of the rapid charge sweep. The sweep current consumption Ic remains as it is in the same way as applied in the background digital camera 25 (see FIG. 1). The sweep current consumption Ic for sweeping unnecessary electric charges is subjected to no changes as shown in a dotted line square of FIG. 6 and ΔIc is not superimposed, thereby preventing a maximum current consumption Imax to flow.

When the system controller 111 determines that a selected mode is not the temperature detection mode in Step S2 (No in Step S2), the system controller 111 proceeds the process to Step S5. In Step S5, the system controller 111 determines whether the power voltage detection mode is selected and when the system controller 111 determines that the selection result is YES, the system controller instructs the process to go to Step S6 in which the system controller 111 determines whether the power voltage Va is below a pre-assigned standard voltage Vso.

Generally, the voltage of batteries used as a power source for digital cameras is decreased with the passage of time. With the current consumption being constant in an imaging apparatus on one hand, the power voltage is increased when the power voltage is decreased. However, there is a limitation on how much current the battery is capable of supplying, and when the current consumption increases rapidly in a low voltage status, an imaging apparatus turns out to be out of work abruptly.

In the preferred embodiment of the present invention, data on standard voltage Vs, which serves as a standard of detection in the power voltage detection mode, are pre-stored in the EEPROM 116. In Step S6 of FIG. 5, the power voltage of digital cameras is detected and obtained in a predetermined time interval by a voltage detection circuit equipped in digital cameras or in each point designated by the sequence of each of the operations. It is noted that when the power voltage is obtained by every sequence, in due consideration of the power voltage Va with varying sequence according to the sequence of an imaging apparatus, regarding the standard voltage Vso, two or more of the voltage values are required to be set according to differing sequences.

Accordingly, in Step S6, the power voltage Va that is detected by the power voltage detection circuit is compared with the standard voltage Vso, and when it is determined that the comparison result is that Va is greater than Vso which does not satisfy the condition that Va is equal to or smaller than Vso (No in Step S6), then the system controller 111 proceeds the process to Step S9 and an imaging operation is performed in a sequence in which the duration of rapidly outputting unnecessary electric charges and the duration of outputting pulse indicating the closure of the mechanical shutter are overlapped.

In Step S6, when the system controller 111 determines that the power voltage satisfies the condition that Va is equal to or smaller than Vso (Yes in Step S6), the system controller 111 proceeds the process to Step S4 and a phase change is performed in which the duration of outputting a shutter pulse is shifted to the front by a unit of time designated by the vertical scanning signals VD, as shown in FIG. 6. In this case, the duration of a rapid sweep of unnecessary electric charges and the duration of outputting the pulse indicating closure of the mechanical shutter do not overlap so that a shutter pulse current consumption Is is not superimposed on the sweep current consumption Ic consumed in the duration of rapid sweep of unnecessary charges. The sweep current consumption Ic remains as it is in the same way as applied in background digital camera 25 (see FIG. 1). The sweep current consumption Ic for sweeping unnecessary electric charges is subjected to no changes as shown in a dotted line square of FIG. 6 and ΔIc is not superimposed, thereby preventing a maximum current consumption Imax to flow.

In Step S5, when the system controller 111 determines that the power voltage mode is not selected (No in Step S5), the system controller 111 proceeds the process to Step S7 in which it is determined whether the current consumption detection mode is selected. If the detection result is NO, the system controller 111 instructs the process to be finished, and if the detection result is YES, the system controller 111 instructs the process to go to Step S8 in which it is determined whether the current consumption Ia is below a pre-assigned standard current Iso.

In digital cameras of this kind, an increase in the current consumption causes batteries to have more burden. When the increasing current consumption goes beyond the limitation of current supply by the batteries, an imaging apparatus does not work because of lack of power supply to the imaging apparatus.

In the preferred embodiment of the present invention, data on standard current Iso, which serves as a standard of detection in the current consumption detection mode, are pre-stored in the EEPROM 116. In Step S8 of FIG. 5, the current consumption Ia of digital cameras is detected and obtained in a predetermined time interval by a current consumption detection circuit equipped in the digital camera or in each point designated by the sequence of each of the operations. It is noted that when the current consumption Ia is obtained by every sequence, in due consideration of the current consumption Ia with varying sequence according to the sequence of an imaging apparatus, regarding the standard current consumption Iso, two or more of the current consumption values are required to be set according to differing sequences.

In Step S8, when the system controller 111 determines that the current consumption Ia satisfies the condition that Ia is equal to or bigger than Iso (Yes in Step S8), the system controller 111 instructs the process to proceed to Step S4 and a phase change is performed in which the duration of outputting a shutter pulse is shifted to the front by a unit of time designated by the vertical scanning signals VD, as shown in FIG. 6. In this case, the duration of a rapid sweep of unnecessary electric charges and the duration of outputting the pulse indicating closure of the mechanical shutter do not overlap so that a shutter pulse current consumption Is is not superimposed on the sweep current consumption Ic consumed in the duration of rapid outputting of unnecessary charges. The sweep current consumption Ic remains as it is in the same way as applied in conventional digital camera 25 (see FIG. 1). The current consumption Ic for sweeping unnecessary electric charges is subjected to no changes as shown in a dotted line square of FIG. 6 and ΔIc is not superimposed, thereby preventing a maximum current consumption Imax to flow.

As described so far, in the preferred embodiment of the present invention, users select any of the environmental temperature detection mode, the power voltage detection mode, and the current consumption detection mode. In the environmental temperature mode, with Ta as the temperature of the imaging environment, Tso as a standard temperature for detection, the system controller 111 determines whether Ta is equal to or smaller than Tso. In the power voltage mode, with Va as the power voltage of an imaging apparatus, Vso as a standard voltage for detection, the system controller 111 determines whether Va is equal to or smaller than Vso. In the current consumption mode, with Ia as the current consumption, Iso as a standard voltage for detection, the system controller 111 determines whether Ia is equal to or smaller than Iso. After the above-described inequalities are satisfied, the phase change controller 118 shifts the duration in which a shutter pulse is output to the front by a unit of time designated by the vertical scanning signal VD. A phase change is performed in which the duration of outputting a shutter pulse is shifted to the front by a unit of time designated by the vertical scanning signal VD. In the above-described case, the duration of a rapid sweep of unnecessary electric charges and the duration of outputting the pulse indicating closure of the mechanical shutter do not overlap so that a shutter pulse current consumption Is is not superimposed on the sweep current consumption Ic consumed in the duration of rapid outputting of unnecessary charges. The sweep current consumption Ic remains as it is in the same way as applied in conventional digital camera 25. The current consumption Ic for outputting unnecessary electric charges is subjected to no changes as shown in a dotted line square of FIG. 6 and ΔIc is not superimposed, thereby preventing a maximum current consumption Imax to flow.

Figure 7:
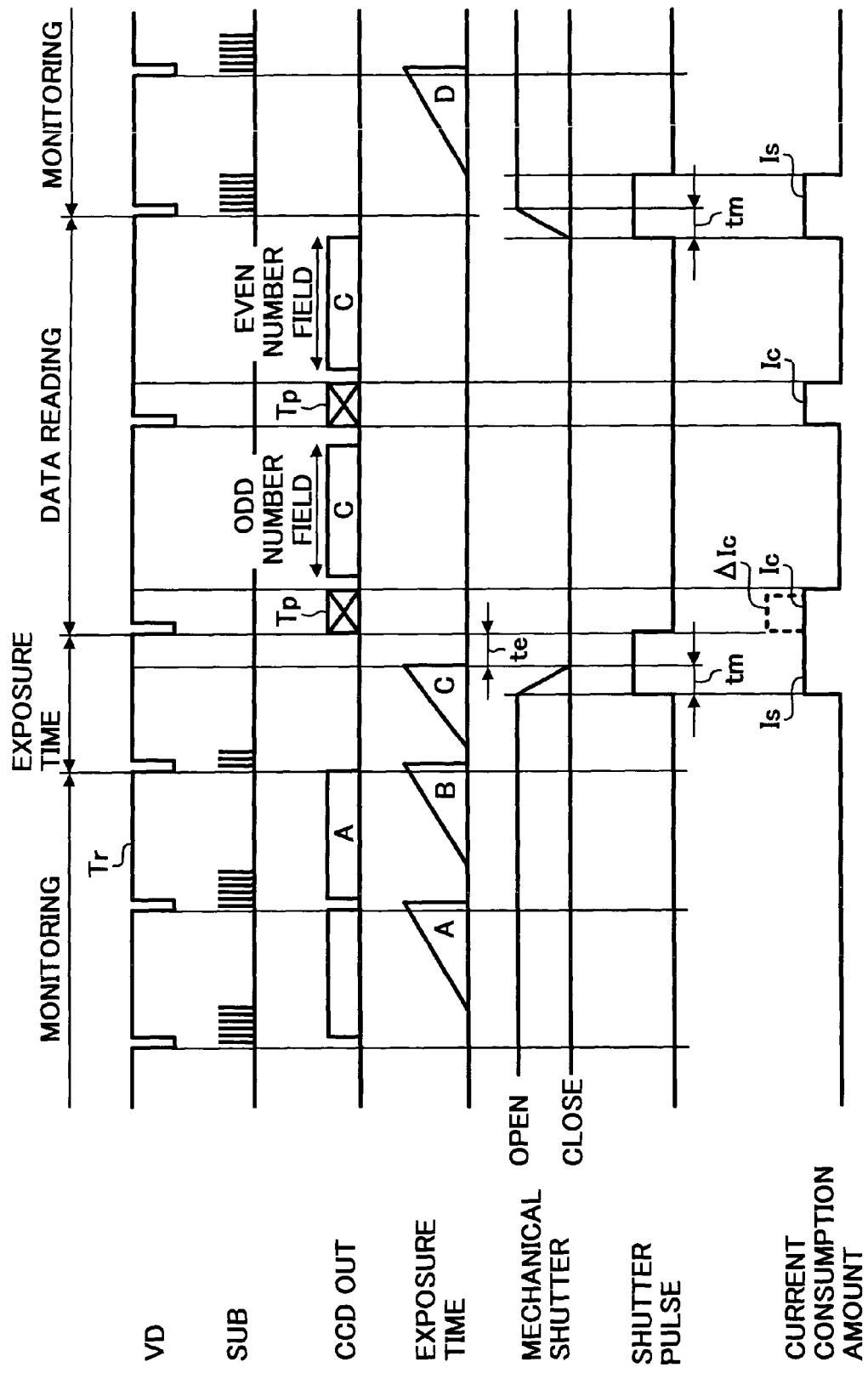
FIG. 7 is a time chart showing an exemplary relationship among the signals produced in anther image operation performed by the digital camera of FIG. 4.

Referring to FIG. 7, another exemplary operation performed by the digital camera 100 is explained. In this operation, the system controller 11 controls the imaging process such that the shutter pulse is sent by the shutter drive circuit 117 so that the shutter is released and closed immediately before the duration Tp in which unnecessary electric charges are output. Immediately before a start of the sweep of unnecessary electric charges, the mechanical shutter is completely closed.

Therefore, the duration of the rapid sweep of unnecessary electric charges and the duration of output of pulse indicating the closure of the mechanical shutter do not overlap. The shutter pulse current consumption Is is not superimposed on output current consumption of outputting unnecessary electric charges. The current consumption Ic remains as it is. The current consumption Ic for outputting unnecessary electric charges is subjected to no changes as shown in a dotted line square of FIG. 7 and ΔIc is not superimposed, thereby preventing a maximum current Imax consumption Imax to flow.

As described above, in the digital camera 100, users select any of the environmental temperature detection mode, the power voltage detection mode, and the current consumption detection mode. In the environmental temperature mode, with Ta as the temperature of the imaging environment, Tso as a standard temperature for detection, the system controller 111 determines whether Ta is equal to or smaller than Tso. In the power voltage mode, with Va as the power voltage of an imaging apparatus, Vso as a standard voltage for detection, the system controller 111 determines whether Va is equal to or smaller than Vso. In the current consumption mode, with Ia as the current consumption, Iso as a standard voltage for detection, the system controller 111 determines whether Ia is equal to or smaller than Iso. After the above-described inequalities are satisfied, a phase change is performed in which the duration of outputting a shutter pulse is shifted to the front by a unit of time designated by the vertical scanning signal VD. In the above-described case, the duration of a rapid sweep of unnecessary electric charges and the duration of outputting the pulse indicating closure of the mechanical shutter do not overlap so that a shutter pulse current consumption Is is not superimposed on the sweep current consumption Ic consumed in the duration of rapid outputting of unnecessary charges. The sweep current consumption Ic remains as it is in the same way as applied in conventional digital camera 25. The current consumption Ic for outputting unnecessary electric charges is subjected to no changes as shown in a dotted line square of FIG. 7 and ΔIc is not superimposed, thereby preventing a maximum current consumption Imax to flow.

As shown FIG. 7, the shutter is released and closed immediately before the duration Tp in which unnecessary electric charges are output. Immediately before a start of the output of unnecessary electric charges, the mechanical shutter is completely closed. Therefore, the duration of the rapid sweep of unnecessary electric charges and the duration of output of a pulse indicating the closure of the mechanical shutter do not overlap. The shutter pulse current consumption Is is not superimposed on output current consumption of outputting unnecessary electric charges. The sweep current consumption Ic remains as it is. The sweep current consumption Ic for outputting unnecessary electric charges is subjected to no changes as shown in a dotted line square of FIG. 7 and ΔIc is not superimposed, thereby preventing a maximum current consumption Imax to flow.

Figure 8:
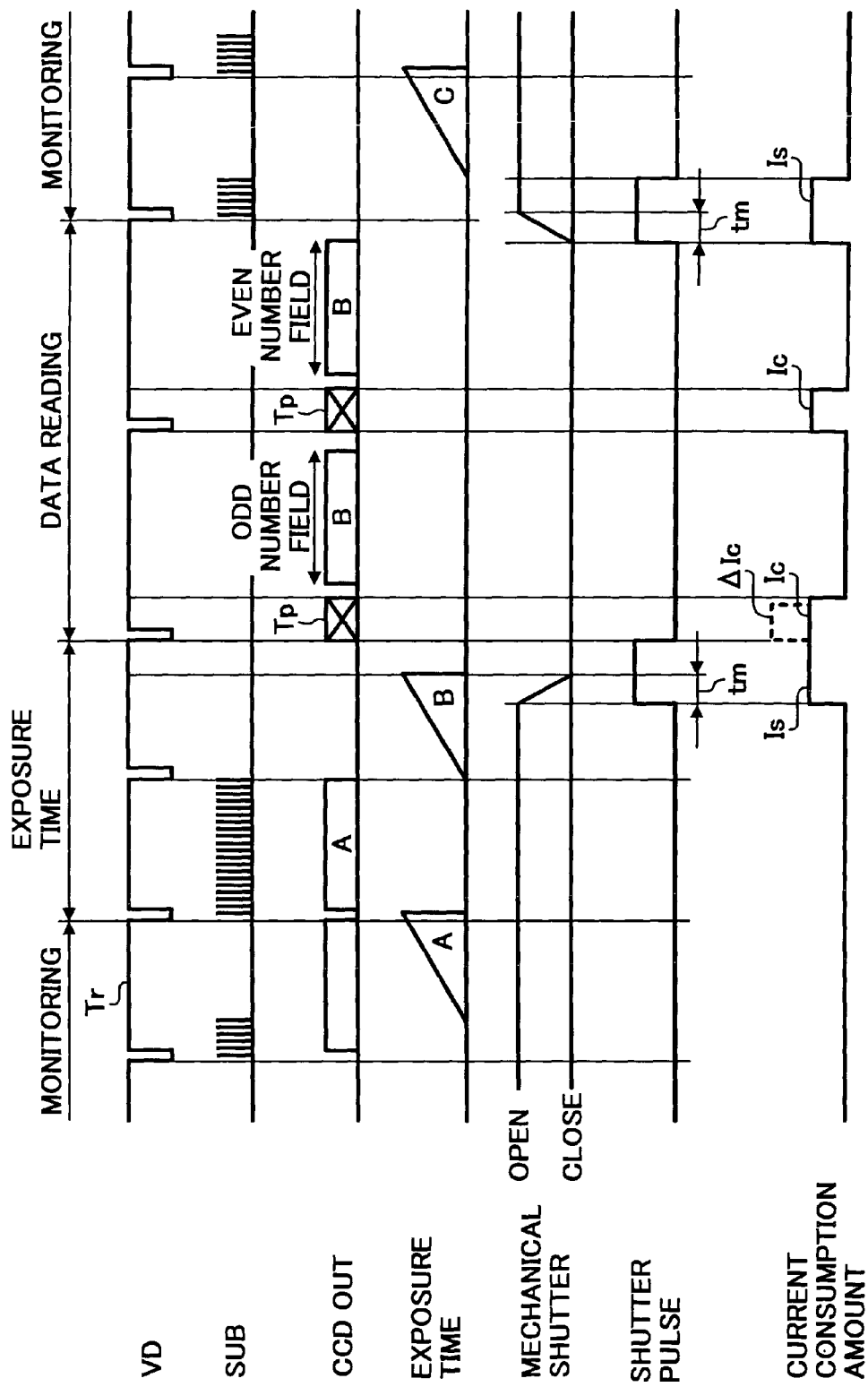
FIG. 8 is a time chart showing an exemplary relationship among the signals produced in anther image operation performed by the digital camera of FIG. 4.

Referring to FIG. 8, another exemplary operation performed by the digital camera 100 is explained. In this operation, control of the system controller 111 controls the imaging operation such that the shutter pulse is sent by the shutter drive circuit 7 so that the shutter is released and closed immediately before the duration Tp in which unnecessary electric charges are output. Immediately before a start of the sweep of unnecessary electric charges, the mechanical shutter is completely closed. An exposure time may be adjusted arbitrarily in two units of time corresponding to the vertical synchronous signal VD under control of the system controller 11. Hence, an exposure time may be adjusted by outputting the sub-pulse SUB from the vertical scanning signal VD twice durations of the rapid duration of unnecessary electric charges Tp before the vertical synchronous signal. In this case, when taking a picture in a bright place, it is enough to take a short exposure time and the exposure time is set as one unit of time corresponding to one unit of the vertical synchronous signal VD. In a dark place, an exposure time is needed to be a long time. Two units of time are assigned according to two units of vertical synchronous signal VD.

As described above, in the preferred embodiment of the present invention, users select any of the environmental temperature detection mode, the power voltage detection mode, and the current consumption detection mode. In the environmental temperature mode, with Ta as the temperature of the imaging environment, Tso as a standard temperature for detection, it is determined whether Ta is equal to or smaller than Tso. In the power voltage mode, with Va as the power voltage of an imaging apparatus, Vso as a standard voltage for detection, the system controller 111 determines whether Va is equal to or smaller than Vso. In the current consumption mode, with Ia as the current consumption, Iso as a standard voltage for detection, it is determined whether Ia is equal to or smaller than Iso. After the above-described inequalities are satisfied, a phase change is performed in which the duration of outputting a shutter pulse is shifted in advance by a unit of time designated by the vertical scanning signal VD. In the above-described case, the duration of a rapid outputting of unnecessary electric charges and the duration of outputting the pulse indicating closure of the mechanical shutter do not overlap so that a shutter pulse current consumption Is is not superimposed on the sweep current consumption IC consumed in the duration of rapid outputting of unnecessary charges. The sweep current consumption Ic remains as it is in the same way as applied in conventional digital camera 25. The current consumption Ic for outputting unnecessary electric charges is subjected to no changes as shown in a dotted line square of FIG. 8 and ΔIc is not superimposed, thereby preventing a maximum current consumption Imax to flow.

As shown FIG. 8, the shutter is released and closed immediately before the duration Tp in which unnecessary electric charges are output. Immediately before a start of the output of unnecessary electric charges, the mechanical shutter is completely closed. Therefore, the duration of the rapid sweep of unnecessary electric charges and the duration of output of a pulse indicating the closure of the mechanical shutter do not overlap. The shutter pulse current consumption Is is not superimposed on output current consumption of outputting unnecessary electric charges. The current consumption Ic remains as it is. The current consumption Ic for outputting unnecessary electric charges is subjected to no changes as shown in a dotted line square of FIG. 8 and ΔIc is not superimposed, thereby preventing a maximum current Imax consumption Imax to flow.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. JPAP2002-232495 filed on Aug. 9, 2002, in the Japanese Patent Office, the entire contents of which are hereby incorporated by reference herein.

The invention claimed is:

1. An imaging apparatus, comprising:
    an image optical pick-up device including vertical charge transfer paths and configured to photoelectrically convert an incident light image of a subject of a photograph and to output a conversion result as image signals;
    a first driving mechanism configured to drive the image optical pick-up device and having a rapid sweep function for rapidly draining unnecessary electric charges remaining in the image optical pick-up device through the vertical charge transfer paths;
    a shutter configured to open and close a light passage for passing the incident light image of the subject of the photograph into the image optical pick-up device;
    a second driving mechanism configured to generate pulses to drive the shutter; and
    a driving current controlling mechanism configured to control the image optical pick-up device and the shutter such that under predetermined environmental imaging conditions a pulse for closing the shutter is shifted earlier in time, and thereby a first duration in which the first driving mechanism operates the rapid sweep function and a second duration in which the second driving mechanism generates the pulse for closing the shutter do not overlap under the predetermined imaging environmental conditions.

2. An imaging apparatus as defined in claim 1, further comprising a determining mechanism configured to determine whether the imaging apparatus is under the predetermined imaging environmental conditions.

3. An imaging apparatus as defined in claim 2, wherein the determining mechanism checks an environmental temperature relative to the imaging apparatus and determines that the imaging apparatus is under the predetermined environmental conditions when the imaging environmental temperature is below a predetermined standard temperature.

4. An imaging apparatus as defined in claim 2, wherein the determining mechanism checks a power supply voltage of the imaging apparatus and determines that the imaging apparatus is under the predetermined environmental conditions when the power supply voltage is below a predetermined standard voltage.

5. An imaging apparatus as defined in claim 2, wherein the determining mechanism checks a current consumption of the imaging apparatus and determines that the imaging apparatus is under the predetermined environmental conditions when the current consumption is below a predetermined standard current consumption.

6. An imaging apparatus, comprising:
   image pick-up means for converting an incident light image of a subject of a photograph and outputting a conversion result as image signals, the image pick-up means having vertical charge transfer paths;
   first driving means for driving the image pick-up means and performing a rapid sweep function for rapidly draining unnecessary electric charges remaining in the image pick-up means through the vertical charge transfer paths;
   means for opening and closing a light passage for passing the incident light image of the subject of the photograph into the image pick-up device;
   second driving means for generating pulses to drive the means for opening and closing the light passage; and
   driving current controlling means for controlling the image pick-up means and the means for opening and closing the light passage such that under predetermined environmental imagine conditions a pulse for closing the shutter is shifted earlier in time, and thereby a first duration in which the first driving means operates the rapid sweep function and a second duration in which the second driving mechanism generates the pulse for closing the means for opening and closing the light passage do not overlap under the predetermined imaging environmental conditions.

7. An imaging apparatus as defined in claim 6, further comprising determining means for determining whether the imaging apparatus is under the predetermined imaging environmental conditions.

8. An imaging apparatus as defined in claim 7, wherein the determining means checks an environmental temperature relative to the imaging apparatus and determines that the imaging apparatus is under the predetermined environmental conditions when the imaging environmental temperature is below a predetermined standard temperature.

9. An imaging apparatus as defined in claim 7, wherein the determining means checks a power supply voltage of the imaging apparatus and determines that the imaging apparatus is under the predetermined environmental conditions when the power supply voltage is below a predetermined standard voltage.

10. An imaging apparatus as defined in claim 7, wherein the determining means checks a current consumption of the imaging apparatus and determines that the imaging apparatus is under the predetermined environmental conditions when the current consumption is below a predetermined standard current consumption.

11. An imaging method for an imaging apparatus, comprising:
    performing a rapid sweep function for rapidly draining unnecessary electric charges remaining in an image optical pick-up device through vertical charge transfer paths of the image optical pick-up device;
    driving a shutter to capture an incident light image of a subject of a photograph through the image optical pick-up device;
    converting the incident light image of the subject of the photograph in a photoelectrical manner; and
    outputting a conversion result as image signals,
    wherein the performing and driving are controlled such that under predetermined environmental imaging conditions a pulse for closing the shutter is shifted earlier in time, and thereby a first duration in which the rapid sweep function is operated and a second duration in which the pulse for closing the shutter is generated do not overlap under the predetermined imaging environmental conditions.

12. An imaging method as defined in claim 11, further comprising determining whether the imaging apparatus is under the predetermined imaging environmental conditions.

13. An imaging method as defined in claim 12, wherein the determining checks an environmental temperature relative to the imaging apparatus and determines that the imaging apparatus is under the predetermined environmental conditions when the imaging environmental temperature is below a predetermined standard temperature.

14. An imaging apparatus as defined in claim 12, wherein the determining checks a power supply voltage of the imaging apparatus and determines that the imaging apparatus is under the predetermined environmental conditions when the power supply voltage is below a predetermined standard voltage.

15. An imaging apparatus as defined in claim 12, wherein the determining checks a current consumption of the imaging apparatus and determines that the imaging apparatus is under the predetermined environmental conditions when the current consumption is below a predetermined standard current consumption.

* * * * *